INVENTOR
GERALD S. PERKINS

ATTORNEYS

United States Patent Office 3,487,281
Patented Dec. 30, 1969

3,487,281
DETENTING SERVOMOTOR
James E. Webb, Administrator of the National Aeronautics and Space Administration with respect to an invention by Gerald S. Perkins, Altadena, Calif.
Filed May 17, 1967, Ser. No. 640,786
Int. Cl. H02p 3/02, 3/06
U.S. Cl. 318—382      4 Claims

ABSTRACT OF THE DISCLOSURE

A braking arrangement comprising a permanent magnet defining opposite poles supported on a shaft, coextensive with a motor's shaft. A pair of pole pieces are radially positioned with respect to the permanent magnet and form a magnetic yoke therefor. When the motor is energized, a counter EMF is induced by currents in short circuited windings supported on the pole pieces. This force tends to slow the shafts' rotation once the motor is de-energized. The shafts finally come to rest when the poles of the permanent magnet are aligned with the pole pieces.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 4257).

BACKGROUND OF THE INVENTION

Field of the invention

This invention relates to electromagnetic circuitry and, more particularly, to an electromagnetic braking arrangement for controlling the rotation of a rotor in an electric motor.

Description of the prior art

In the prior art, whenever the rotor or an electric motor is to be prevented from coasting after the power to the motor is turned off, braking or electromechanical clutch arrangements are generally employed. This is particularly true in servo systems in which the accurate positioning of the rotor of a servo motor is very important. The use of prior art electromechanical braking or clutch arrangements, though often a necessity, is quite undesirable, both from increased cost and performance points of view. Such arrangements produce undesirable surface friction, and break away torque. Also, they generally include lubricants which are temperature sensitive, a characteristic which is most undesirable in spacecraft applications.

OBJECTS AND SUMMARY OF THE INVENTION

It is, therefore, a primary object of the present invention to provide a new arrangement for preventing the coasting of a motor rotor after power turn off.

Another object is to provide a novel electromagnetic braking arrangement to minimize the coasting of a rotor of a servo motor and thereby control the final rest position thereof.

A further object of the invention is to provide an electromagnetic braking arrangement for use with a simple servo motor for accurate positioning of the rotor thereof without a complex closed loop correction system.

These and other objects of the invention are achieved by providing an electromagnetic braking arrangement which includes a permanent magnet, positioned on a shaft which is coextensive with the motor's rotor. At least two stator-like poles are positioned near the outer surface of the magnet. The poles are interconnected by a yoke. A short-circuited winding is wound about each of the poles. The windings are analogous to field windings except for being short circuited. When the motor is energized and its rotor rotates, the permanent magnet turns in unison therewith, inducing maximum current in the windings which generate a counter electromagnetic force (EMF). This force in essence produces a torque on the rotor which is counter to that developed by the motor torque. However, it is very small compared to the motor torque, so that its effect on the rotation of the rotor can be neglected. However, once the power to the motor is turned off the counter torque produced by the counter EMF becomes significant, tending to slow down the rotor and finally stopping it when the magnetic poles of the permanent magnet are aligned with the two stator-like poles, which together with the yoke provide a return path for the flux lines of the permanent magnet.

The novel features that are considered characteristic of this invention are set forth with particularity in the appended claims. The invention itself, both as to its organization and method of operation, as well as additional objects and advantages thereof, will best be understood from the following description when read in connection with the accompanying drawings.

DESCRIPTION OF THE PREFERRED EMBODIMENTS

Figure 1:
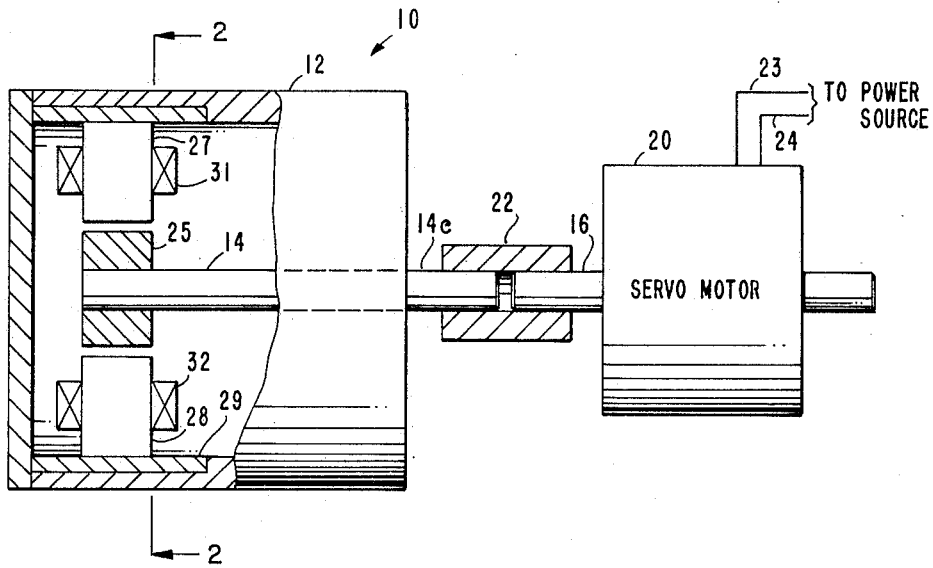
FIGURE 1 is a diagram of the electromagnetic arrangement of the present invention with a part of the housing removed.

Attention is now directed to the figures, in which like elements are designated by like numerals. In FIGURE 1, the electromagnetic braking device of the present invention is designated by numeral 10 and shown comprising of a housing 12, which supports a shaft 14, having one end 14e extending through the housing. This end is adapted to be connected to a shaft or rotor of any motor whose shaft's rotation is to be controlled to minimize coasting. In FIGURE 1, the end 14e of shaft 14 is shown coupled to a shaft 16 of a servo motor 20, by means of a coupling member 22, so that shaft 14 rotates in unison with shaft 16. For explanatory purposes, motor 20 is assumed to include a pair of leads 23 and 24 connectable to a power source (not shown) which supplies energizing power to the motor.

Within housing 12, a cylindrical permanent magnet 25 is supported on the shaft 14, so that as shaft 14 rotates the magnet 25 rotates therewith. Aligned with the magnet 25 are magnetic pole-pieces 27 and 28 which are magnetically connected by a cylindrical yoke 29, supported within the housing.

Windings 31 and 32 are shown wound about the polepieces 27 and 28, respectively. In a preferred embodiment, the windings are closed loops or short circuited. As will be explained hereafter, the function of the windings is to generate a counter electromagnetic force which is produced as a result of the currents induced to flow therein, as the permanent magnet 25 rotates, thereby causing the windings to cut the flux lines of the magnet's magnetic field.

In practice, when power is applied to motor 20 and shaft 16 thereof rotates at a selected speed of rotation, shaft 14 coupled thereto and the magnet 25 rotate at the same speed. Thus, a rotating magnetic field is produced in the housing 12. Since short circuit windings 31 and 32 are located in this rotating field, currents are induced therein, which in turn generate a counter or back electromagnetic force (EMF) in a manner well known in the art of electrical motors. Since the windings 31 and 32 are perferably short circuited maximum currents flow therein, and a maximum counter EMF is generated. This force (counter EMF) produces a torque on the shaft 14 which is counter to that prouded by the motor 20. However, the counter torque produced by the counter EMF and is only a small fraction of the total motor torque, so that it has substantially no effect on the shaft's speed of rotation, as long as power is applied to the motor.

Once, however, the power is cut off, and the shafts continue to rotate or coast, the magnitude of the counter torque is sufficient to reduce the free coasting of shaft 14 and therefore the coasting of shaft 16.

As a result, after several revolutions the shafts come to a practical standstill. As the coasting is reduced and the shafts are nearly at rest, the magnetic field produced by the permanent magnet tends to rotate the shaft until the magnetic poles of the magnet 25, designated in FIGURE 2 by N for North and S for South, are aligned with the two pole-pieces 27 and 28, so that the pole pieces together with the yoke 29 provide a magnetic path of least resistance for the magnetic flux lines between the N and S poles of the magnet. Once so aligned, the shafts 14 and 16 remain in a substantially locked position until power is again applied to motor 20.

Figure 2:
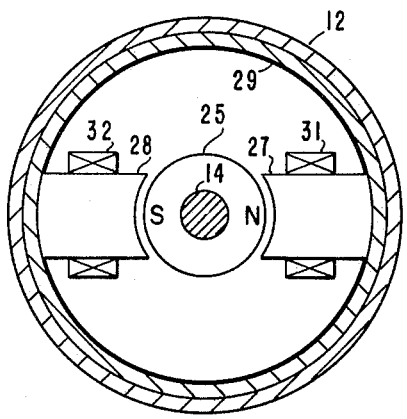
FIGURE 2 is a cross sectional view along line 2—2 of FIGURE 1.

In FIGURE 2, the N and S poles of magnet 25 are shown aligned with pole-pieces 27 and 28, however it should be appreciated that with only two pole-pieces, the shaft 14 may be locked in a position when the N and S poles are aligned with poles 28 and 27 respectively. Thus, in the arrangement diagrammed in FIGURE 2, the shaft 14 may be locked in either of two positions. Also in the foregoing description, the pole-pieces 27 and 28 are assumed to be connected by yoke 29 to form a return path for the flux lines of magnet 25. However, it should be appreciated that the three parts (27, 28, 29) may be formed of a single member such as a multipole stator, well known in the art of electrical motors.

It should further be pointed out that although in the foregoing description the poles (N and S) of magnet 25 are on diametrically opposite ends thereof, and therefore pole-pieces 27 and 28 are aligned along a diameter of housing 12 on opposite sides of the axis of rotation of shaft 14, the invention is not limited thereto. Rather, when using a permanent magnet 25 with a pair of magnetic poles, whatever the shape of the magnet, the pole-pieces 27 and 28 have to be disposed so that when the shaft 14 comes to rest, one pole of magnet 25 is aligned with one pole-piece and the other with the other pole-piece. Also, more than one pair of pole-pieces may be included, so that the magnet 25 may align itself with any one of the pairs of pole-pieces, thereby increasing the number of positions in which the shaft may be magnetically locked.

Figure 3:
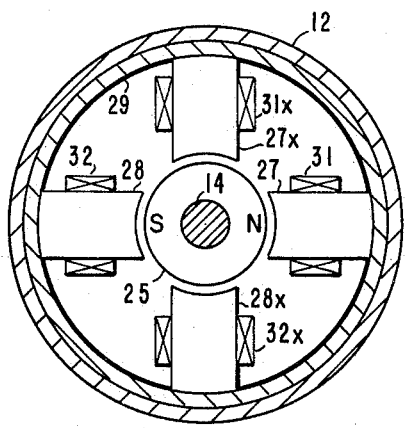
FIGURE 3 is a cross sectional view of another embodiment of the invention.

FIGURE 3 to which reference is made herein is a cross-sectional view of an arrangement similar to that shown in FIGURE 2, except for two additional pole-pieces 27x and 28x having windings 31x and 32x wound thereon. From the foregoing, it should be appreciated that the shaft 14 may be magnetically locked when pole N is aligned with any one of the four pole-pieces and the pole S is aligned with the opposite pole-piece.

In reducing the invention to practice, it has been found that a shaft of a servo, which in the absence of braking arrangement tends to coast about 500 revolutions before stopping after power cutoff, can be stopped with the novel arrangement disclosed herein within 3 turns, thus greatly increasing the accuracy with which a device (not shown) coupled to shaft 16 of motor 20 may be positioned. For example, assume that a load is coupled to the shaft 16 by a gear reduction assembly having a 10,000/1 ratio. Thus, the ambiguity in the stopping position of the load is 1/10,000 that of the stopped position of the motor shaft. Since the motor has a 3 turn ambiguity, the load would have a .0003 turn ambiguity or 0.1 degree positioning accuracy, making the motor well suited for many remote position control functions, without complex servo closed loops or prior art complex clutches or braking devices.

From the foregoing, it should be appreciated that in accordance with the teaching of the invention, an electromagnetic braking arrangement is provided to minimize the free coasting of a motor shaft and magnetically lock the position thereof after power cut off. The reduction in coasting is provided by producing a counter EMF which does not affect the motor's torque when power is applied to the motor, but which provides a counter torque to the motor's shaft after power cut off, sufficient to practically stop the shaft after a minimum number of coasting turns. A permanent magnet is used to bring the shaft to a complete stop and magnetically lock the shaft in any one of a plurality of defined positions.

It is appreciated that those familiar with the art may make modifications in the arrangements as shown without departing from the true spirit of the invention. Therefore, all such modifications and/or equivalents are deemed to fall within the scope of the invention as claimed in the appended claims.

What is claimed is:

1. An electromagnetic braking device for reducing the coasting of a rotor of a motor after the energizing power applied to said motor is cut off, the device comprising:
   a shaft adapted to be coupled to the rotor of a motor so as to rotate in unison therewith;
   cylindrical means defining first and second opposite magnetic poles supported on said shaft to rotate therewith;
   at least two stator-like magnetic pole-pieces, positioned adjacent said cylindrical means with only air gaps defined therebetween;
   a magnetizable yoke coupling said magnetic pole-pieces; and
   a short-circuited winding wound about each magnetic pole-piece, whereby currents induced in said windings when said cylindrical means rotate on said shaft generate electromagnetic forces tending to inhibit the rotation of said shaft, with said shaft stopping when said two magnetic pole-pieces are aligned with said first and second magnetic poles to provide together with said magnetizable yoke a path for magnetic flux between said magnetic poles.

2. The electromagnetic braking device as recited in claim 1 wherein said cylindrical means comprise a permanent magnet defining first and second magnetic poles which are at diametrically opposite ends of said permanent magnet and said two stator-like magnetic pole-pieces comprising first and second pole-pieces are on opposite sides of the axis of rotation of said shaft, whereby said shaft stops either when said first magnetic pole is aligned with said first pole-piece and said second magnetic pole is aligned with said second pole-piece, or when said first and second magnetic poles are aligned with said second and first pole-pieces, respectively.

3. An electromagnetic braking device for limiting the coasting of a rotor of a motor after the removal of the application of power thereto comprising:
   a shaft adapted to be coupled to the rotor of said motor to rotate in unison therewith;
   a permanent magnet supported on said shaft, said magnet defining first and second opposite magnetic poles;
   at least first and second magnetic pole-pieces positioned on opposite sides with respect to the axis of rotation of said shaft said pieces being coupled by a magnetic yoke; and
   a short circuited winding wound about each of said magnetic pole-pieces, each having a current induced therein as a function of the rotation of said permanent magnet, whereby said currents generate a counter electromagnetic force to inhibit the rotation of said permanent magnet and the shaft on which it is supported.

4. The electromagnetic braking device as recited in claim 3 further including third and fourth magnetic pole-pieces, said pole-pieces equidistantly positioned about said permanent magnet, whereby said shaft is magnetically locked in any one of four positions when the first magnetic pole is aligned with one of said pole-pieces and the second magnetic pole is alined with an opposite pole-piece.

References Cited

UNITED STATES PATENTS

| | | | |
|---|---|---|---|
| 2,796,572 | 6/1957 | Tallant | 318—382 |
| 2,971,105 | 2/1961 | Jaeschke | 310—93 |
| 2,415,022 | 1/1947 | Morrison | 318—184 |
| 2,704,343 | 3/1955 | Streuber | 318—45 |
| 2,805,373 | 9/1957 | Bonnell | 310—191 |
| 3,046,463 | 7/1962 | Johnson | 318—184 |

ORIS L. RADER, Primary Examiner

K. L. CROSSON, Assistant Examiner

U.S. Cl. X.R.

310—156; 318—184